(12) United States Patent
Takayanagi et al.

(10) Patent No.: US 8,422,860 B2
(45) Date of Patent: Apr. 16, 2013

(54) IMAGE PROCESSING APPARATUS

(75) Inventors: Wataru Takayanagi, Hyogo (JP); Yukio Mori, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 347 days.

(21) Appl. No.: 12/856,961

(22) Filed: Aug. 16, 2010

(65) Prior Publication Data

US 2011/0052145 A1  Mar. 3, 2011

(30) Foreign Application Priority Data

Aug. 28, 2009 (JP) ................................. 2009-197598

(51) Int. Cl.
*H04N 9/80* (2006.01)
(52) U.S. Cl.
USPC .......................................................... 386/241
(58) Field of Classification Search .................. 386/200, 386/241
See application file for complete search history.

(56) References Cited

U.S. PATENT DOCUMENTS

2003/0026594 A1* 2/2003 Shiiyama ........................ 386/69
2004/0202456 A1* 10/2004 Sasagawa ..................... 386/120
2005/0232588 A1  10/2005 Hosoda et al.

FOREIGN PATENT DOCUMENTS

| JP | 2000-261741 A | 9/2000 |
| JP | 2005-277531 A | 10/2005 |
| JP | 2007-266659 A | 10/2007 |
| JP | 2008-017500 A | 1/2008 |
| JP | 2008-148121 A | 6/2008 |
| JP | 2008-166895 A | 7/2008 |

* cited by examiner

*Primary Examiner* — Huy T Nguyen
(74) *Attorney, Agent, or Firm* — Westerman, Hattori, Daniels & Adrian, LLP (57) ABSTRACT

An image processing apparatus includes a recorder. A recorder records repeatedly-fetched object scene images as a moving image. An extractor extracts one portion of the object scene images recorded by the recorder, in parallel with the recording process of the recorder. An evacuator alternatively evacuates a predetermined number, which is an upper limit, of the object scene images extracted by the extractor. An allocator allocates the object scene images evacuated by the evacuator at a time point at which the recording process of the recorder is ended, to the moving image recorded by the recorder. A controller starts up the evacuator at a frequency that is decreased according to an increase in an amount of moving images recorded by the recorder.

11 Claims, 13 Drawing Sheets

RGST1

| COLUMN No. | 1 | 2 | 3 | 4 | 5 | 6 | 7 | 8 | 9 |
|---|---|---|---|---|---|---|---|---|---|
| REAL FRAME No. | | | | | | | | | |
| SIGNIFICANT FRAME No. | | | | | | | | | |

FIG.4

RGST1

| COLUMN No. | 1 | 2 | 3 | 4 | 5 | 6 | 7 | 8 | 9 |
|---|---|---|---|---|---|---|---|---|---|
| REAL FRAME No. | 1 | 2 | 3 | 4 | 5 | 6 | 7 | 8 | 9 |
| SIGNIFICANT FRAME No. | 1 | 2 | 3 | 4 | 5 | 6 | 7 | 8 | 9 |

(A) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 10 | 2 | 3 | 4 | 5 | 6 | 7 | 8 | 9 |

↑ OVERWRITE (B) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 10 | 2 | 12 | 4 | 5 | 6 | 7 | 8 | 9 |

↑ OVERWRITE (C) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 10 | 2 | 12 | 4 | 14 | 6 | 7 | 8 | 9 |

↑ OVERWRITE (D) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 10 | 2 | 12 | 4 | 14 | 6 | 16 | 8 | 9 |

↑ OVERWRITE (E) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 10 | 2 | 12 | 4 | 14 | 6 | 16 | 8 | 18 |

↑ OVERWRITE

FIG.7

(A) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 10 | 20 | 12 | 4 | 14 | 6 | 16 | 8 | 18 |

↑ OVERWRITE (B) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 10 | 20 | 12 | 4 | 14 | 24 | 16 | 8 | 18 |

↑ OVERWRITE (C) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 28 | 20 | 12 | 4 | 14 | 24 | 16 | 8 | 18 |

↑ OVERWRITE (D) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 28 | 20 | 12 | 4 | 32 | 24 | 16 | 8 | 18 |

↑ OVERWRITE (E) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 28 | 20 | 12 | 4 | 32 | 24 | 16 | 8 | 36 |

↑ OVERWRITE

FIG.8

(A) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 28 | 20 | 12 | 40 | 32 | 24 | 16 | 8 | 36 |

↑ OVERWRITE (B) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 28 | 20 | 48 | 40 | 32 | 24 | 16 | 8 | 36 |

↑ OVERWRITE (C) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 28 | 56 | 48 | 40 | 32 | 24 | 16 | 8 | 36 |

↑ OVERWRITE (D) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 64 | 56 | 48 | 40 | 32 | 24 | 16 | 8 | 36 |

↑ OVERWRITE (E) RGST1

| COLUMN No. | 1 | 2 | 3 | 4 | 5 | 6 | 7 | 8 | 9 |
|---|---|---|---|---|---|---|---|---|---|
| SIGNIFICANT FRAME No. | 64 | 56 | 48 | 40 | 32 | 24 | 16 | 8 | 72 |

↑ OVERWRITE

FIG.9

PREVIEW IMAGE

| RFN =23 | RFN =293 | RFN =584 |
|---|---|---|
| RFN =831 | RFN =1267 | RFN =1536 |
| RFN =1935 | RFN =2538 | RFN =3263 |

IMAGE PROCESSING APPARATUS

CROSS REFERENCE OF RELATED APPLICATION

The disclosure of Japanese Patent Application No. 2009-197598, which was filed on Aug. 28, 2009, is incorporated herein by reference.

BACKGROUND OF THE INVENTION

1. Field of the Invention

The present invention relates to an image processing apparatus. More particularly, the present invention relates to an image processing apparatus which is applied to a digital video camera and which creates a predetermined number of images indicating a whole content of recorded moving images.

2. Description of the Related Art

According to one example of this type of apparatus, all frames configuring a moving image are divided into n frame groups, and n representative images are respectively extracted from the n divided frame groups. The n extracted representative images are displayed on an image monitor in a frame-by-frame playback manner.

However, in the above-described apparatus, the process for extracting the representative images is executed when the moving image is reproduced, and thus, it is probable that it takes a time to display an overview of the moving image.

SUMMARY OF THE INVENTION

An image processing apparatus according to the present invention comprises: a recorder which records repeatedly fetched object scene images as a moving image; an extractor which extracts one portion of the object scene images recorded by the recorder, in parallel with the recording process of the recorder; an evacuator which alternatively evacuates a predetermined number, which is an upper limit, of the object scene images extracted by the extractor; an allocator which allocates the object scene images evacuated by the evacuator at a time point at which the recording process of the recorder is ended, to the moving image recorded by the recorder; and a controller which starts up the evacuator at a frequency that is decreased according to an increase in an amount of the moving images recorded by the recorder.

An image processing program product according to the present invention is an image processing program product executed by a processor of an image processing apparatus provided with a recorder which records repeatedly-fetched object scene images as a moving image, comprises: an extracting step of extracting one portion of the object scene images recorded by the recorder, in parallel with the recording process of the recorder; an evacuating step of alternatively evacuating a predetermined number, which is an upper limit, of the object scene images extracted by the extracting step; an allocating step of allocating the object scene images evacuated by the evacuating step at a time point at which the recording process of the recorder is ended, to the moving image recorded by the recorder; and a controlling step of starting up the evacuating step at a frequency that is decreased according to an increase in an amount of moving images recorded by the recorder.

An image process method according to the present invention is an image process method executed by an image processing apparatus provided with a recorder which records repeatedly-fetched object scene images as a moving image, comprises: an extracting step of extracting one portion of the object scene images recorded by the recorder, in parallel with the recording process of the recorder; an evacuating step of alternatively evacuating a predetermined number, which is an upper limit, of the object scene images extracted by the extracting step; an allocating step of allocating the object scene images evacuated by the evacuating step at a time point at which the recording process of the recorder is ended, to the moving image recorded by the recorder; and a controlling step of starting up the evacuating step at a frequency that is decreased according to an increase in an amount of moving images recorded by the recorder.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
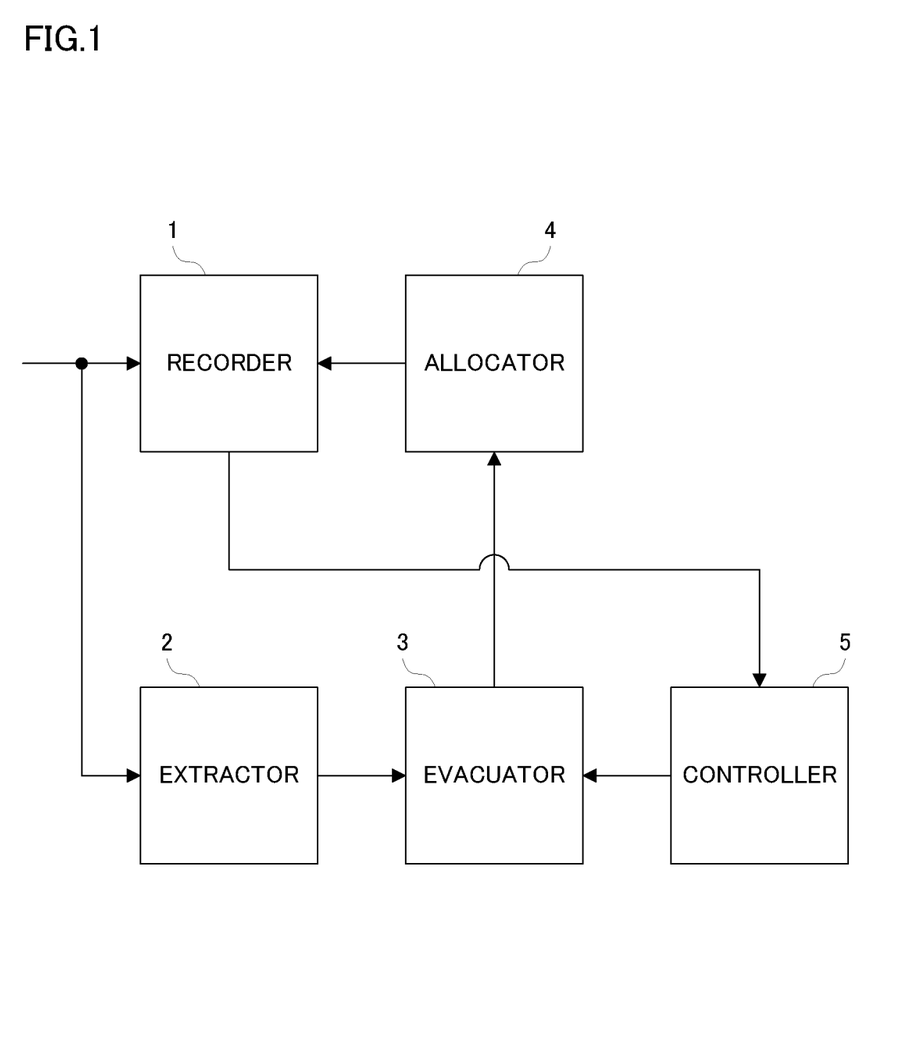
FIG. 1 is a block diagram showing a basic configuration of one embodiment of the present invention.

With reference to FIG. 1, an image processing apparatus of one embodiment of the present invention is basically configured as follows: A recorder 1 records repeatedly-fetched object scene images as a moving image. An extractor 2 extracts one portion of the object scene images recorded by the recorder 1, in parallel with the recording process of the recorder 1. An evacuator 3 alternatively evacuates a predetermined number, which is an upper limit, of the object scene images extracted by the extractor 2. An allocator 4 allocates the object scene images evacuated by the evacuator 3 at a time point at which the recording process of the recorder 1 is ended, to the moving image recorded by the recorder 1. A controller 5 starts up the evacuator 3 at a frequency that is decreased according to an increase in an amount of moving images recorded by the recorder 1.

Thus, one portion of the recorded object scene images is extracted in parallel with the recording process, and the predetermined number, which is the upper limit, of the extracted object scene images are alternatively evacuated. Furthermore, the frequency at which the evacuating process is started up is decreased according to an increase in the amount of the recorded moving images. Therefore, intervals of the predetermined number of the evacuated object scene images increase according to an increase in the amount of the recorded moving images, and the predetermined number of the evacuated object scene images are to represent a whole content of the recorded moving image. The allocating of such a predetermined number of the object scene images to the recorded moving image enables shortening of a time period required for displaying an overview of the recorded moving image.

Figure 2:
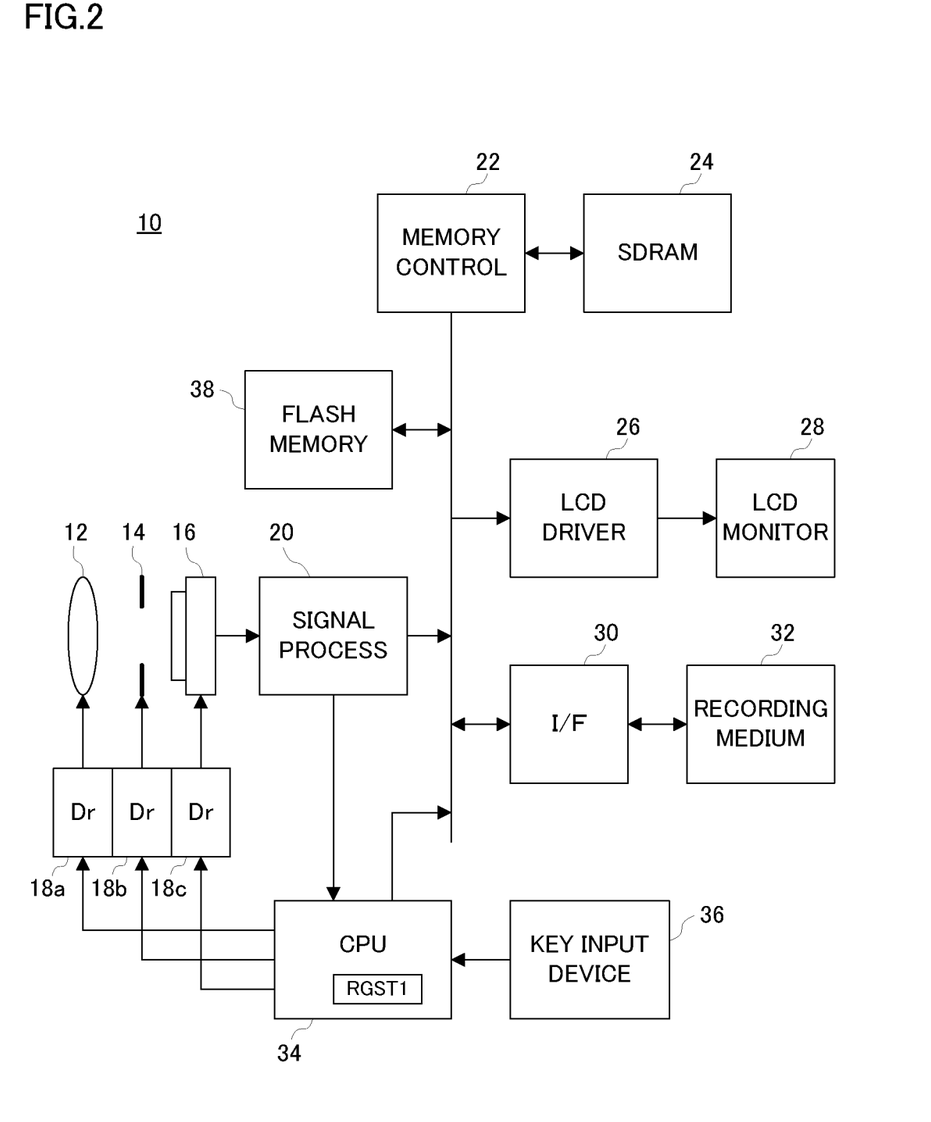
FIG. 2 is a block diagram showing a configuration of one embodiment of the present invention.

With reference to FIG. 2, a digital camera 10 according to this embodiment includes a focus lens 12 and an aperture unit 14 respectively driven by drivers 18a and 18b. An optical image of an object scene enters, with irradiation, an imaging surface of an image sensor 16 through these members.

When a power source is applied, a CPU 34 starts up a driver 18c in order to execute a moving-image fetching process under an imaging task. In response to a vertical synchronization signal Vsync generated at every 1/60th of a second, the driver 18c exposes the imaging surface and reads out the electric charges produced on the imaging surface in a raster scanning manner. From the image sensor 16, raw image data representing the object scene is outputted at a frame rate of 60 fps.

A signal processing circuit 20 performs processes, such as color separation, white balance adjustment, and YUV conversion, on the raw image data from the image sensor 16 so as to create YUV formatted-image data. The created image data is written into an SDRAM 24 through a memory control circuit 22.

An LCD driver 26 repeatedly reads out the image data accommodated in the SDRAM 24 through the memory control circuit 22, and drives an LCD monitor 28 based on the read-out image data. As a result, a real-time moving image (through image) representing the object scene is displayed on a monitor screen.

The signal processing circuit 20 applies Y data produced by the YUV conversion to the CPU 34. The CPU 34 fetches the Y data from the signal processing circuit 20 under an imaging-condition adjusting task, and performs a simple AE process on the fetched Y data. An appropriate aperture amount and an appropriate exposure time period calculated thereby are set to the drivers 18b and 18c, respectively. Thereby, a brightness of the through image is moderately adjusted. Moreover, the CPU 34 performs an AF process on a high-frequency component of the Y data applied from the signal processing circuit 20. The focus lens 12 is moved by the driver 18a in an optical-axis direction, and is placed at a focal point. As a result, a sharpness of the through image is continuously improved.

When a recording start operation is performed on a key input device 36, the CPU 34 accesses a recording medium 32 through an I/F 30 under the imaging task and newly creates an image file on the recording medium 32 (the created file is opened).

Upon completion of the file creating process and the file opening process, the CPU 34 starts up the I/F 30 in order to start a recording process. The I/F 30 reads out the image data accommodated in the SDRAM 24 through the memory control circuit 22 at each 1/60th of a second, and writes the read-out image data, i.e., the moving image data, into the image file that is in an opened state.

When a recording end operation is performed on the key input device 36, the CPU 34 stops the I/F 30 in order to end the recording process. Subsequently, the CPU 34 creates preview image data representing an overview of the moving image data accommodated in the image file, based on nine frames of peculiar image data described later, and writes the created preview image data into the same image file. Upon completion of writing the preview image data, the CPU 34 accesses the recording medium 32 through the I/F 30, and closes the image file of a writing destination.

Figure 3:
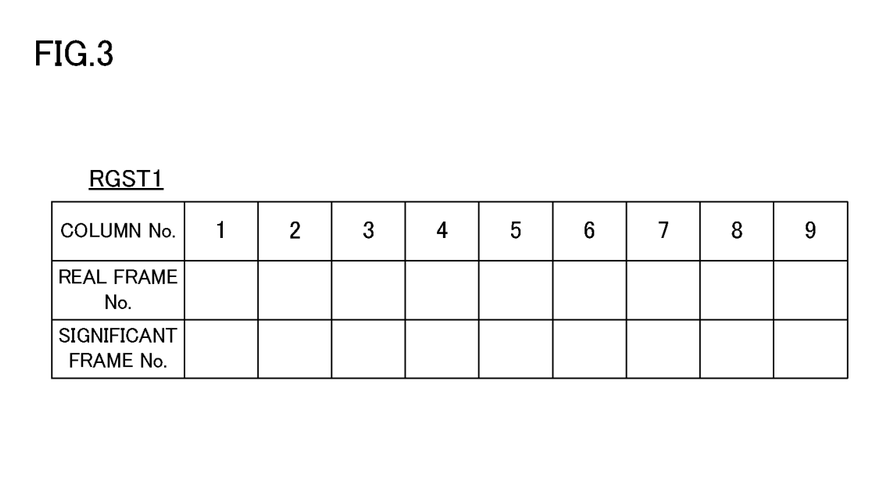
FIG. 3 is an illustrative view showing one example of a configuration of a register referred to by the embodiment in FIG. 2.

The CPU 34 extracts the nine frames of the peculiar image data under a peculiar-image extracting task that is executed in parallel with the imaging task. In the peculiar-image extracting task, a register RGST1 shown in FIG. 3 is referred to. According to FIG. 3, the register RGST1 has nine columns used for registering a real frame number RFN and a significant frame number SFN that are associated to each other.

Herein, the real frame number RFN is equivalent to an identification number continuously allocated to the image data fetched after the recording start operation. Moreover, the significant frame number SFN is equivalent to an identification number continuously allocated to the nine frames of image data after the recording start operation and one portion of the image data that satisfies a predetermined condition.

In the peculiar-image extracting task, real frame numbers RFNs and significant frame numbers SFNs indicating numerical values of "1" to "9" are registered into a first column to a ninth column on the register RGST1 over nine frame periods after the recording start operation. At a time point at which the nine frame periods have elapsed, the register RGST1 is changed to a registration state shown in FIG. 4.

When the nine frame periods elapse from the recording start operation, reference values TPF, JPF, and RJF, an overwrite frame number OWF, and a flag FLG are initialized (details are described later), and a maximum score SCmax is set to "0". When the vertical synchronization signal Vsync is generated, a frame score of the image data of a current frame is calculated.

The frame score increases in the following situations: when a face of a person appears in the object scene; when a complexion of a face existing in the object scene is changed; when a period during which the object scene is in a stable state (stable state: a state where there is a small movement in camera shake or pan/tilt, and a state where there is a small change in focus or exposure amount) reaches a threshold value; when a dynamic object appears in the object scene; when the exposure amount or the white-balance adjustment gain is changed abruptly (i.e., a scene is changed); and when a big sound is generated.

Figure 5:
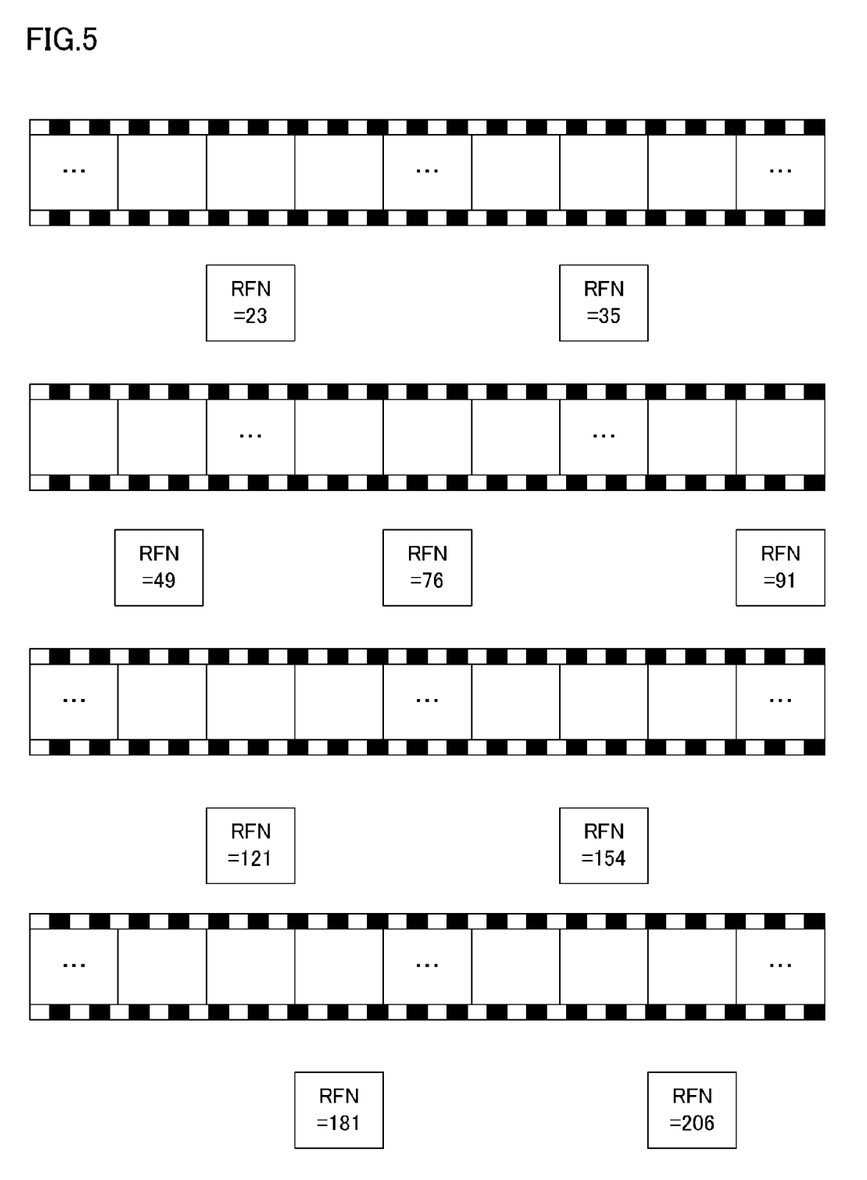
FIG. 5 is an illustrative view showing one portion of behavior of extracting an object scene image that satisfies a predetermined condition.

When the calculated frame score exceeds the maximum score SCmax or a reference score SCth, a frame replacing process is executed. The image data of which the frame score exceeds the maximum score SCmax or the reference score SCth is generated at a timing shown in FIG. 5, for example. The frame replacing process is executed by noticing the image data of which the real frame numbers RFNs are "23", "35", "49", "76", "91", "121", "154", "181", "206", . . . . It is noted that the maximum score SCmax is updated each time a higher frame score is calculated.

As a result of the initialization at the time point at which the nine frame periods have elapsed from the recording start operation, the reference value TPF indicates "1", the reference value JPF indicates "2", and the reference value RE indicates "1". Moreover, an overwritten frame number WFN indicates a number equivalent to the reference value TPF, the overwrite frame number OWF indicates "10", and the flag FLG indicates "0".

In the frame replacing process, the following process is executed with reference to: such reference values TPF, JPF, and RJF; the overwrite frame number OWF; and the flag FLG.

Firstly, the significant frame number SFN is incremented, and the incremented significant frame number SFN is compared with the overwrite frame number OWF. If the significant frame number SFN differs from the overwrite frame number OWF, then the frame replacing process is ended at this time point. If the significant frame number SFN matches the overwrite frame number OWF, then the state of the flag FLG is determined.

When the flag FLG is "0", the reference value RE is changed to a value that is twice the current value and the reference value TPF is set to the overwritten frame number WFN. On the other hand, when the flag FLG is "1", the reference value RE and the overwritten frame number WFN maintain the current values.

When the overwritten frame number WFN is finalized, a variable I is set to each value of "1" to "9" in ascending order, and a subsequent overwrite determining/executing process is executed for nine times corresponding to the values of "1" to "9".

Firstly, it is determined whether or not the significant frame number SFN registered in an I-th column on the register RGST1 is equal to the overwritten frame number WFN. When a determined result is YES, the newly set significant frame number SFN is overwritten in the I-th column of the register RGST1. Moreover, the real frame number RFN is overwritten in the I-th column of the register RGTS1. On the other hand, when the determined result is NO, the overwriting of the significant frame number SFN and the real frame number RFN is omitted.

Upon completion of a total of nine overwrite determining/executing processes, it is determined whether or not the overwritten frame number WFN reaches the value that is nine times the reference value TPF. When a determined result is NO, the reference value JPF is added up in the overwritten frame number WFN, the flag FLG is set to "1", and the reference value RJF is added up in the overwrite frame number OWF. On the other hand, when the determined result is YES, the reference values TPF and JPF are changed to values that are twice the current value, the flag FLG is changed to "0", and the reference value RJF is added up in the overwrite frame number OWF. The frame replacing process is ended after the setting is thus changed.

At the time point at which the nine frame periods have elapsed from the recording start operation, the significant frame number SFN indicates "9"; the reference values TPF, JPF, and RJF indicate "1", "2", and "1", respectively; the overwrite frame number OWF indicates "10"; and the flag FLG indicates "0".

Therefore, in the first frame replacing process, the significant frame number SFN is set to "10". The significant frame number SFN matches the overwrite frame number OWF and the value of the flag FLG at a current time point indicates "0". Thus, the reference value RJF is changed to "2" and the overwritten frame number WFN is set to "1".

Figure 4:
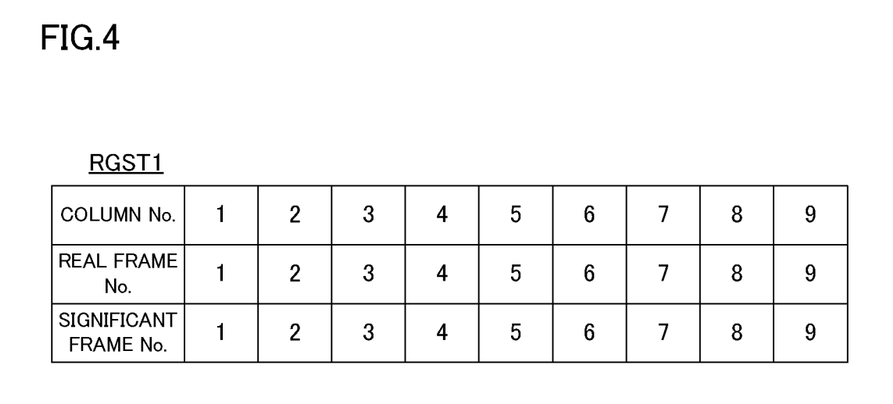
FIG. 4 is an illustrative view showing one example of a registration state of the register shown in FIG. 3.

As shown in FIG. 4, the significant frame number SFN (=1) equal to the overwritten frame number WFN (=1) exists in the first column of the register RGST1. Therefore, the newly-set significant frame number SFN (=10) is overwritten in the first column of the register RGST1, as shown in FIG. 6(A).

Since the reference value JPF indicates "2", the overwritten frame number WFN increases from "3" to "5" to "7" to "9" until the overwritten frame number WFN reaches 9, which is a value that is nine times the reference value TPF. Moreover, in association with such an increasing process of the overwritten frame number WFN, the flag FLG is changed to "1". Furthermore, when the flag FLG indicates "1", the reference value RJF maintains the current value (=2). Thus, also the overwrite frame number OWF increases from "3" to "5" to "7" to "9".

As a result, in a period during which the overwritten frame number WFN reaches "9", the significant frame number SFN described on the register RGST1 is overwritten as shown in FIG. 6(B) to FIG. 6(E).

Figure 6:
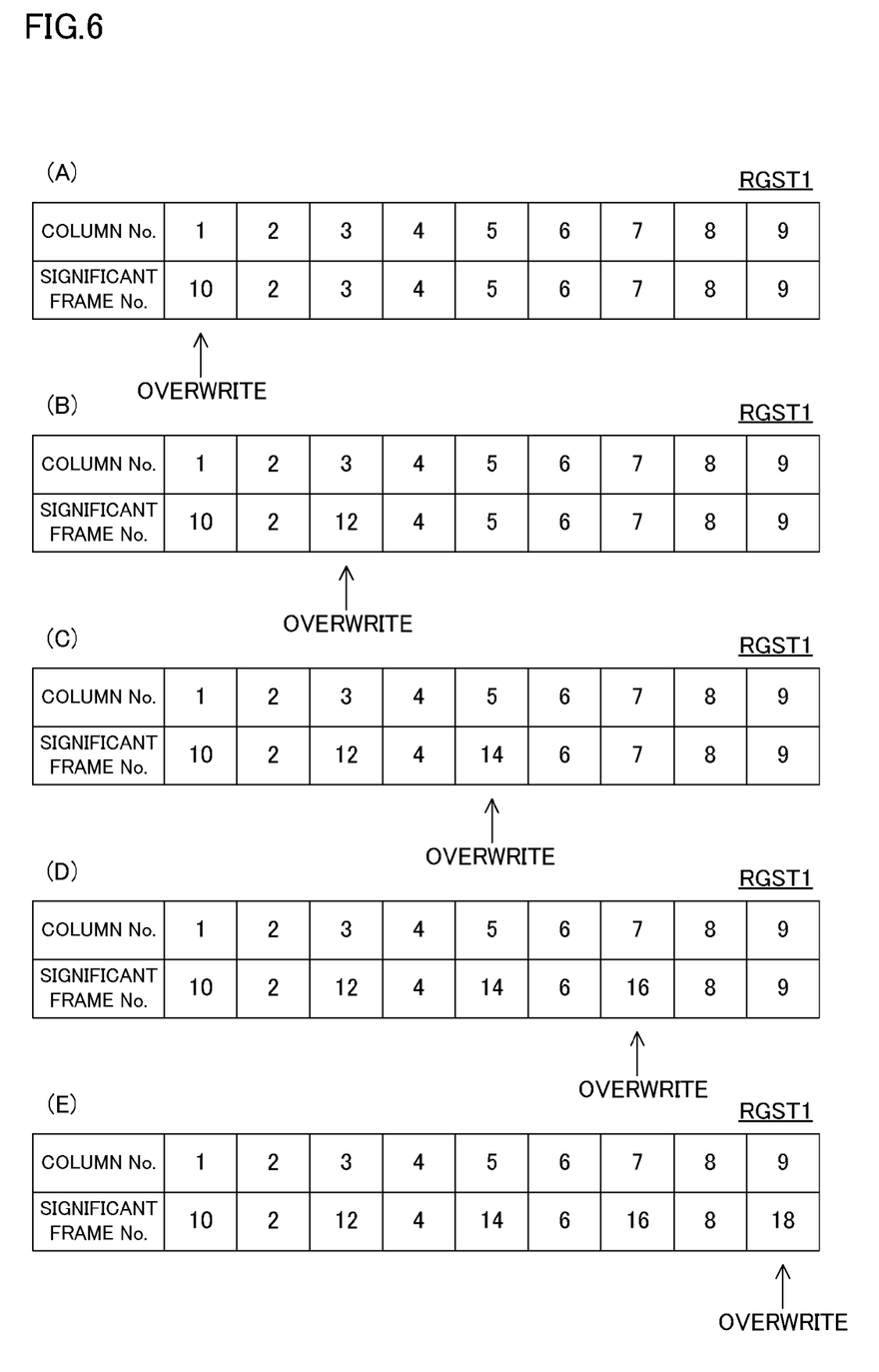
FIG. 6(A) is an illustrative view showing one portion of updating behavior of a significant frame number registered on the register shown in FIG. 3.
FIG. 6(B) is an illustrative view showing another portion of the updating behavior of the significant frame number registered on the register shown in FIG. 3.
FIG. 6(C) is an illustrative view showing still another portion of the updating behavior of the significant frame number registered on the register shown in FIG. 3.
FIG. 6(D) is an illustrative view showing yet another portion of the updating behavior of the significant frame number registered on the register shown in FIG. 3.
FIG. 6(E) is an illustrative view showing another portion of the updating behavior of the significant frame number registered on the register shown in FIG. 3.

At a time point at which the overwriting shown in FIG. 6(E) is ended, the significant frame number SFN indicates "18", the reference values TPF, JPF, and RJF indicate "2", "4", and "2", respectively, and the overwritten frame number WFN indicates "20". Moreover, the flag FLG is returned from "1" to "0".

Therefore, in the subsequent frame replacing process, the significant frame number SFN is set to "19". This significant frame number SFN does not match the overwrite frame number OWF, and thus, the frame replacing process corresponding to SFN=19 is ended here.

In the further subsequent frame replacing process, the significant frame number SFN is set to "20". Then, the significant frame number SFN matches the overwrite frame number OWF. Furthermore, the value of the flag FLG at a current time point indicates "0", and thus, the reference value RJF is changed to "4" and the overwritten frame number WFN is set to "2".

As shown in FIG. 6(E), the significant frame number SFN (=2) equal to the overwritten frame number WFN (=2) exists in the second column of the register RGST1. Therefore, the newly-set significant frame number SFN (=20) is overwritten in the second column of the register RGST1, as shown in FIG. 7(A).

Since the reference value JPF indicates "4", the overwritten frame number WFN increases from "6" to "10" to "14" to "18" until the overwritten frame number WFN reaches "18", which is a value that is nine times the reference value TPF. Moreover, in association with such an increasing process of the overwritten frame number WFN, the flag FLG is changed to "1". Furthermore, when the flag FLG indicates "1", the reference value RJF maintains the current value (=4). Thus, also the overwrite frame number OWF increases from "24" to "28" to "32" to "36".

As a result, in a period during which the overwritten frame number WFN reaches "18", the significant frame number SFN described on the register RGST1 is overwritten as shown in FIG. 7(B) to FIG. 7(E).

Figure 7:
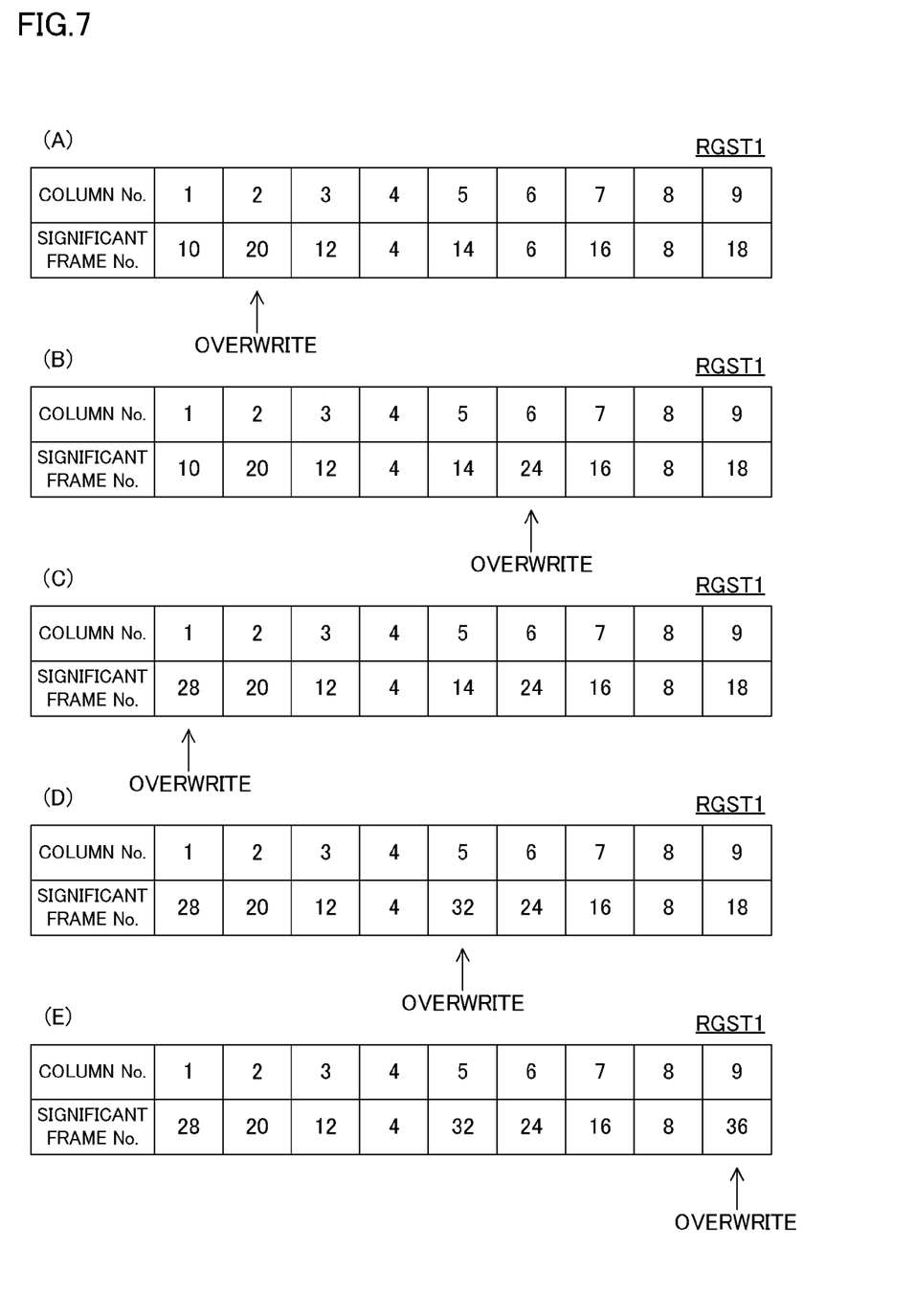
FIG. 7(A) is an illustrative view showing one portion of the updating behavior of the significant frame number registered on the register shown in FIG. 3.
FIG. 7(B) is an illustrative view showing another portion of the updating behavior of the significant frame number registered on the register shown in FIG. 3.
FIG. 7(C) is an illustrative view showing still another portion of the updating behavior of the significant frame number registered on the register shown in FIG. 3.
FIG. 7(D) is an illustrative view showing yet another portion of the updating behavior of the significant frame number registered on the register shown in FIG. 3.
FIG. 7(E) is an illustrative view showing another portion of updating behavior of the significant frame number registered on the register shown in FIG. 3.

At a time point at which the overwriting shown in FIG. 7(E) is ended, the significant frame number SFN indicates "36", the reference values TPF, JPF, and RJF indicate "4", "8", and "4", respectively, and the overwrite frame number OWF indicates "40". Moreover, the flag FLG is returned from "1" to "0".

Therefore, in the subsequent three frame replacing processes, the significant frame numbers SFN are set to "37" to "39". This significant frame number SFN does not match the overwrite frame number OWF, and thus, the frame replacing processes corresponding to SFN=37 to 39 are ended here.

In the further subsequent frame replacing process, the significant frame number SFN is set to "40". Then, the significant frame number SFN matches the overwrite frame number OWF. Furthermore, the value of the flag FLG at a current time point indicates "0", and thus, the reference value RJF is changed to "8" and the overwritten frame number WFN is set to "4".

Figure 8:
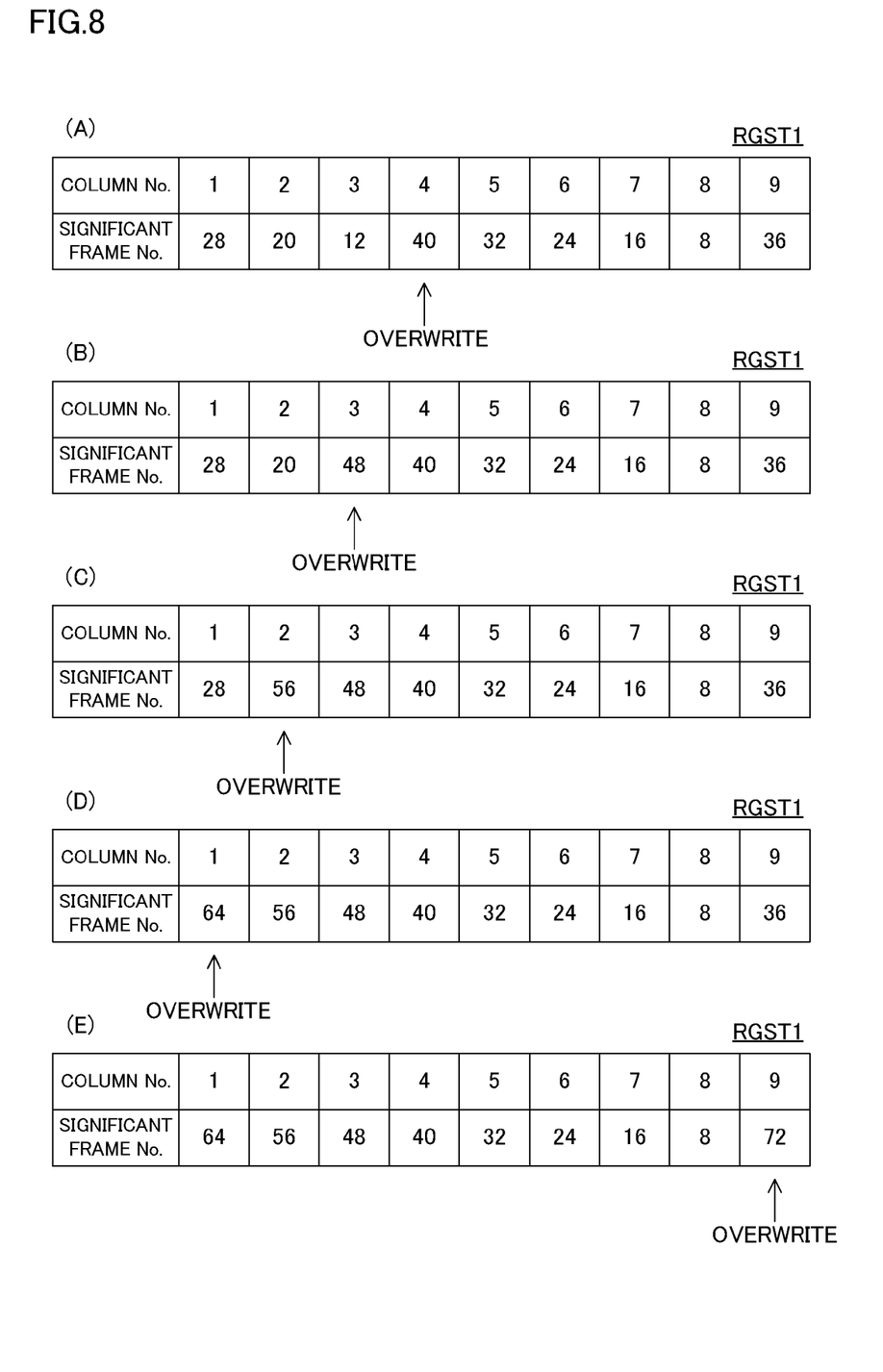
FIG. 8(A) is an illustrative view showing one portion of the updating behavior of the significant frame number registered on the register shown in FIG. 3.
FIG. 8(B) is an illustrative view showing another portion of the updating behavior of the significant frame number registered on the register shown in FIG. 3.
FIG. 8(C) is an illustrative view showing still another portion of the updating behavior of the significant frame number registered on the register shown in FIG. 3.
FIG. 8(D) is an illustrative view showing yet another portion of the updating behavior of the significant frame number registered on the register shown in FIG. 3.
FIG. 8(E) is an illustrative view showing another portion of the updating behavior of the significant frame number registered on the register shown in FIG. 3.

As shown in FIG. 7(E), the significant frame number SFN (=4) equal to the overwritten frame number WFN (=4) exists in the fourth column of the register RGST1. Therefore, the newly-set significant frame number SFN (=40) is overwritten in the fourth column of the register RGST1, as shown in FIG. 8(A).

Since the reference value JPF indicates "8", the overwritten frame number WFN increases from "12" to "20" to "28" to "36" until the overwritten frame number WFN reaches "36", which is a value that is nine times the reference value TPF. Moreover, in association with such an increasing process of the overwritten frame number WFN, the flag FLG is changed to "1". Furthermore, when the flag FLG indicates "1", the reference value RJF maintains the current value (=8). Thus, also the overwrite frame number OWF increases from "48" to "56" to "64" to "72".

As a result, in a period during which the overwritten frame number WFN reaches "36", the significant frame number SFN described on the register RGST1 is overwritten as shown in FIG. 8(B) to FIG. 8(E).

Figure 9:
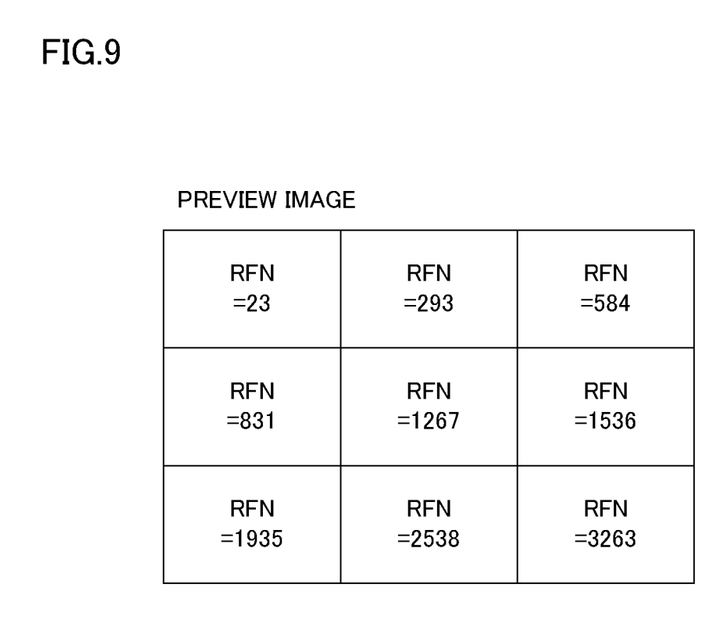
FIG. 9 is an illustrative view showing one example of a preview image created with reference to the register shown in FIG. 3.

The frame replacing process like this is ended when the recording end operation is performed. The preview image data is created based on the nine frames of the peculiar image data respectively corresponding to nine real frame numbers RFNs described on the register RGST1 at this time point. In a case where the nine real frame numbers RFNs are "23", "293", "584", "831", "1267", "1536", "1935", "2538", and "3263", the preview image data shown in FIG. 9 is created. That is, the preview image data is equivalent to the image data in which the corresponding nine frames of the peculiar image data are combined in a multi-display manner.

Figure 10:
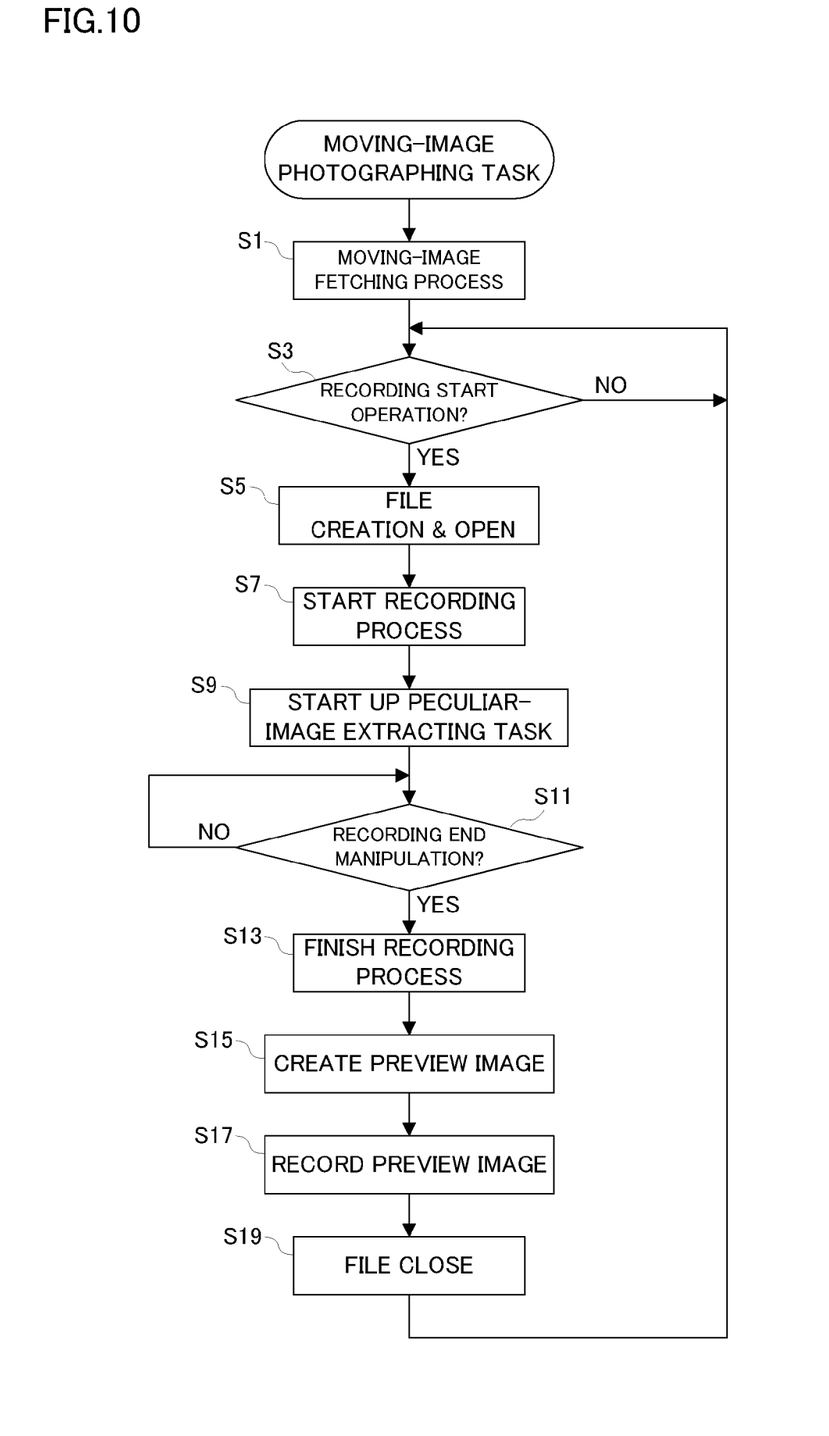
FIG. 10 is a flowchart showing one portion of behavior of a CPU applied to the embodiment in FIG. 2.

The CPU 34 processes a plurality of tasks including a moving-image photographing task shown in FIG. 10, a peculiar-image creating task shown in FIG. 11 to FIG. 14, and an imaging-condition adjusting task not shown, in a parallel manner. It is noted that control programs corresponding to these tasks are stored in a flash memory 38.

With reference to FIG. 10, in a step S1, the moving-image fetching process is executed. Thereby, the through image is displayed on the LCD monitor 28. In a step S3, it is repeatedly determined whether or not the recording start operation is performed. When a determined result is updated from NO to YES, the process advances to a step S5. In the step S5, the recording medium 32 is accessed through the I/F 30 to newly create an image file that is in an opened state on the recording medium 32. In a step S7, the I/F 30 is started in order to start up the recording process. As a result, the image data repeatedly outputted from the signal processing circuit 20 is written into the image file created in the step S5.

In a step S9, a peculiar image extracting task is started up. In a step S11, it is determined whether or not the recording end operation is performed. When a determined result in the step S11 is updated from NO to YES, the process advances to a step S13 so as to stop the I/F 30 in order to end the recording process.

In a step S15, the nine frames of the image data respectively corresponding to the nine real frame numbers RFNs registered on the register RGST1 are read out from the image file that is in an opened state, and based on the nine frames of the read-out image data, the preview image data is created. In a step S17, the created preview image data is written into the image file that is in an opened state. In a step S19, the recording medium 32 is accessed through the I/F 30 so as to close the image file that is in an opened state. Upon completion of the file close, the process returns to the step S3.

Figure 11:
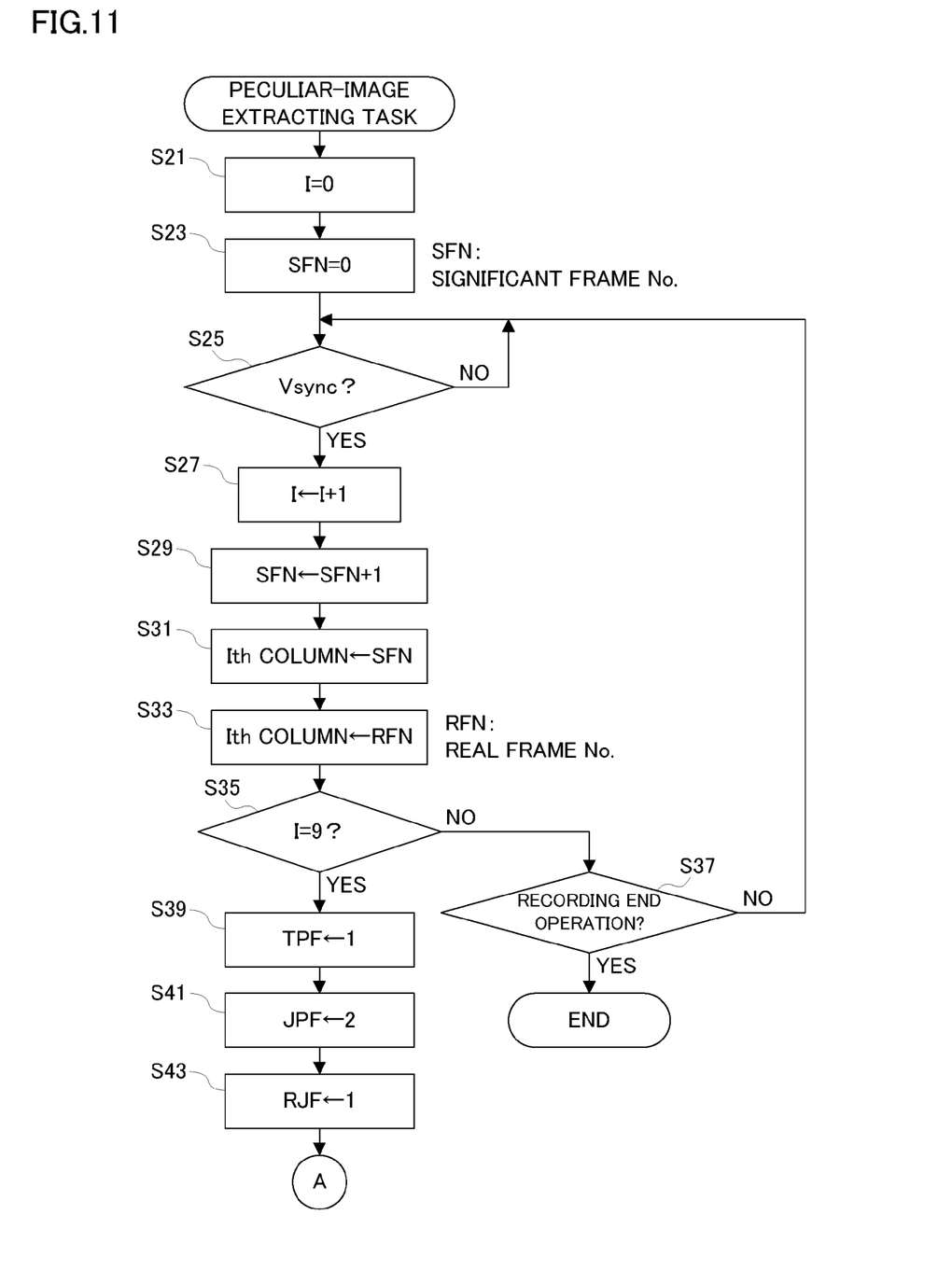
FIG. 11 is a flowchart showing another portion of the behavior of the CPU applied to the embodiment in FIG. 2.

With reference to FIG. 11, in a step S21, the variable I is set to "0", and in a step S23, the significant frame number SNF is set to "0". In a step S25, it is repeatedly determined whether or not the vertical synchronization signal Vsync is generated, and when a determined result is updated from NO to YES, the variable I and the significant frame number SFN are incremented in steps S27 and S29.

In a step S31, the significant frame number SFN is registered into the I-th column of the register RGST1. In a step S33, the real frame number RFN is registered into the I-th column of the register RGST1. Upon completion of the process in the step S33, it is determined in a step S35 whether or not the variable I reaches "9", and it is determined in a step S37 whether or not the recording end operation is performed. When NO is determined both in the steps S35 and S37, the process returns to the step S25. When YES is determined in the step S37, the process is ended. When YES is determined in the step S35, the process advances to a step S39.

Unless the recording end operation is performed, the processes in the steps S27 to S33 are executed for a total of nine times. As a result, the significant frame numbers SFNs indicating the numerical values of "1" to "9" and the real frame numbers RFNs indicating the numerical values of "1" to "9" are registered into the first column to the ninth column of the register RGST1.

Figure 12:
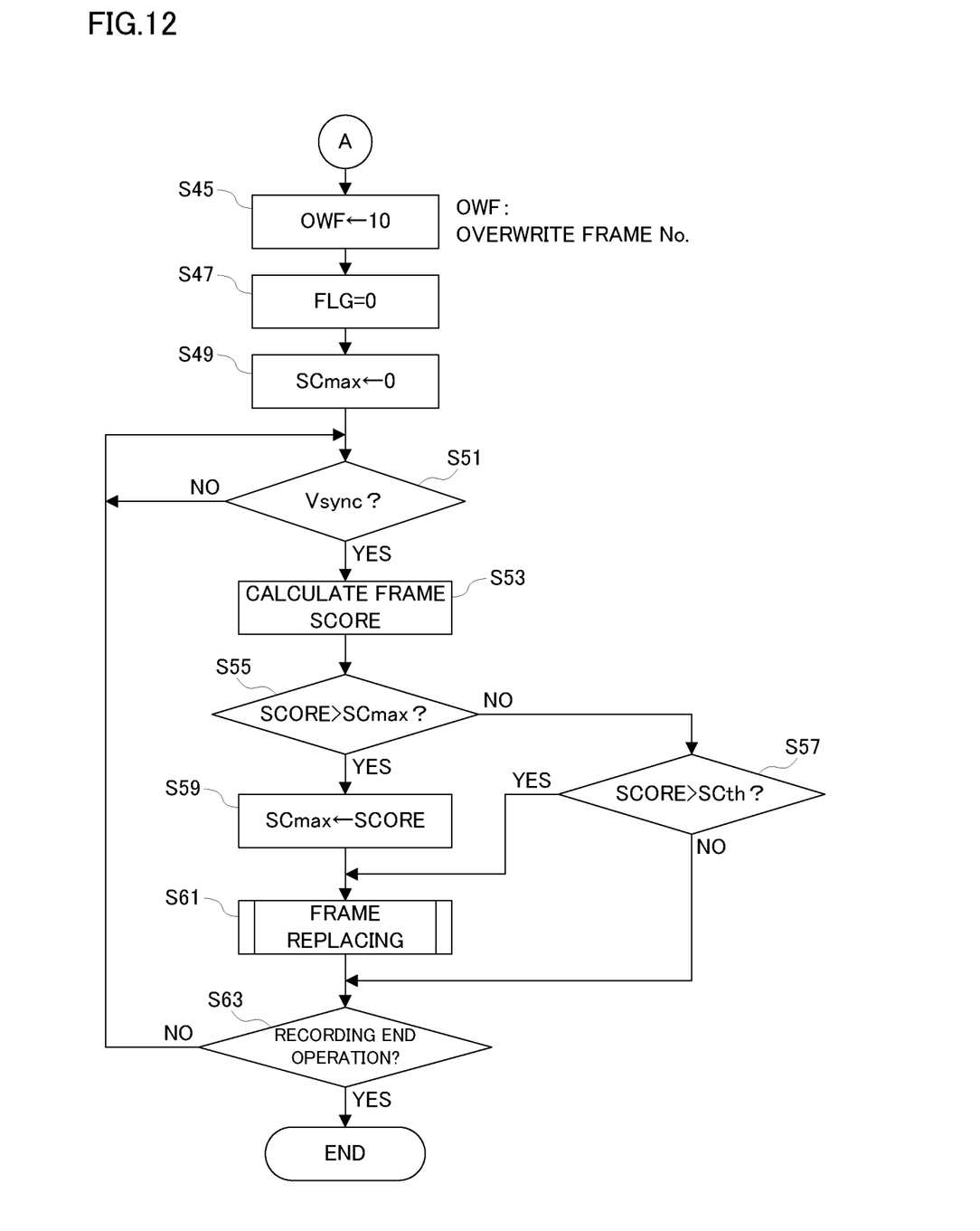
FIG. 12 is a flowchart showing still another portion of the behavior of the CPU applied to the embodiment in FIG. 2.

In the step S39, the reference value TPF is set to "1", in a step S41, the reference value JPF is set to "2", and in a step S43, the reference value RTF is set to "1". Moreover, in a step S45, the overwrite frame number OWF is set to "10", in a step S47, the flag FLG is set to "0", and in a step S49, the maximum score SCmax is set to "0".

In a step S51, it is determined whether or not the vertical synchronization signal Vsync is generated. When a determined result is updated from NO to YES, the process advances to a step S53 so as to calculate the frame score representing a level of peculiarity of the image data of the current frame. The frame score indicates a higher score value as the level of peculiarity increases.

In a step S55, it is determined whether or not the calculated score value exceeds the maximum score value SCmax. In a step S57, it is determined whether or not the calculated score value exceeds the threshold value SCth. When YES is determined in the step S55, the process advances to a step S59 so as to update the maximum score value SCmax by the score value calculated in the immediately preceding step S53. Upon completion of the updating process, the process advances to a step S63 via the frame replacing process in a step S61. In the step S63, it is determined whether or not the recording end operation is performed, and when NO is determined, the process returns to the step S51 while YES is determined, the process is ended.

When YES is determined in the step S57, the frame replacing process is executed in the step S61 without executing the process in the step S59. Thereafter, the process advances to the step S63. When NO is determined in the step S57, the process advances to the step S63 without executing the processes in the steps S59 and S61.

Figure 13:
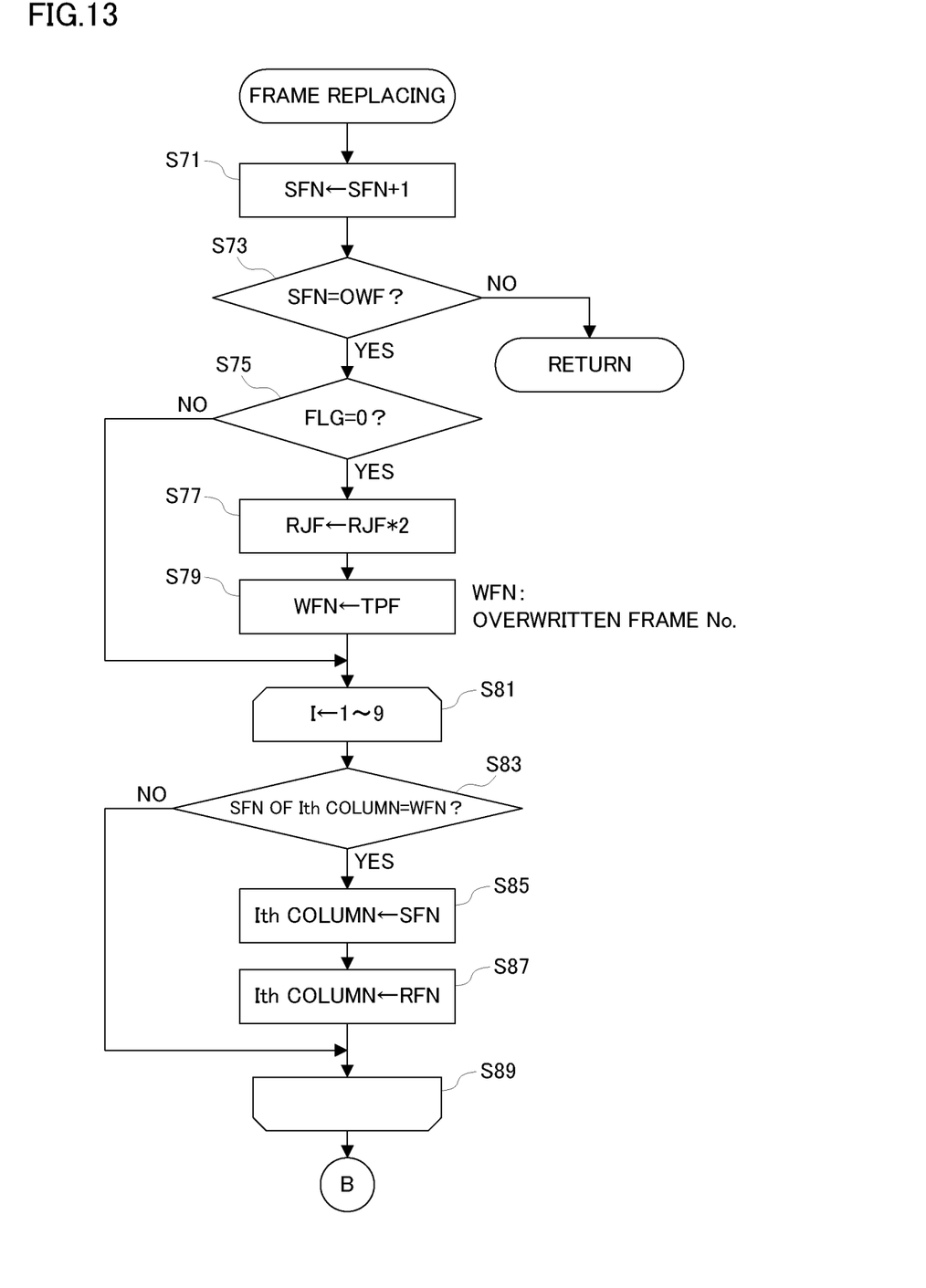
FIG. 13 is a flowchart showing yet another portion of the behavior of the CPU applied to the embodiment in FIG. 2.
Figure 14:
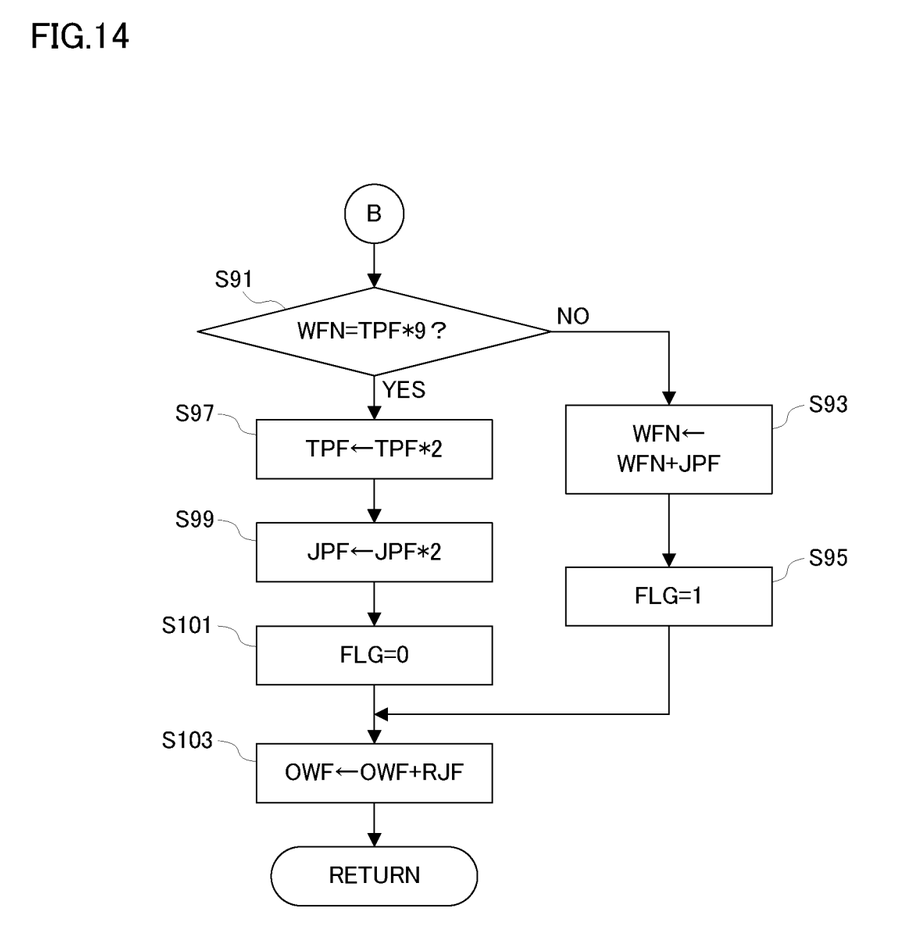
FIG. 14 a flowchart showing another portion of the behavior of the CPU applied to the embodiment in FIG. 2.

The frame replacing process in the step S61 is executed according to a subroutine shown in FIG. 13 and FIG. 14.

Firstly, in a step S71, the significant frame number SFN is incremented. In a step S73, it is determined whether or not the significant frame number SFN is equal to the overwrite frame number OWF. When a determined result is NO, the process is returned to a routine at a hierarchical upper level while when the determined result is YES, the process advances to a step S75.

In the step S75, it is determined whether or not the flag FLG indicates "0", and when NO is determined, the process directly advances to a step S81 while when YES is determined, the process advances to the step S81 via processes in steps S77 to S79 shown below. In the step S77, the reference value RJF is changed to a value that is twice the current value. In the step S79, the reference value TPF is set to the overwritten frame number WFN.

In the step S81, each of the numerical values of "1" to "9" is set to the variable I in ascending order. Therefore, the processes in the steps S81 to S89 are executed for nine times corresponding to the numerical values of "1" to "9". In the step S85, it is determined whether or not the significant frame number SFN registered in the I-th column of the register RGST1 is equal to the overwritten frame number WFN.

When a determined result is NO, the process directly advances to a step S83, and when the determined result is YES, the process advances to the step S83 via processes in the steps S79 to S81 shown below. In the step S79, the significant frame number SFN set in the step S71 is overwritten in the I-th column of the register RGST1. In the step S81, the real frame number RFN is overwritten in the I-th column of the register RGTS1.

Upon completion of the processes in the steps S81 to S89 corresponding to I=9, the process advances to a step S91. In the step S91, it is determined whether or not the overwritten frame number WFN is equal to a value that is nine times the reference value TPF.

When a determined result is NO, in a step S93, the reference value JPF is added up in the overwritten frame number WFN. In a step S95, the flag FLG is set to "1". When the determined result is YES, the reference value TPF is changed to a value that is twice the current value in a step S97. In a step S99, the reference value JPF is changed to the value that is twice the current value, and in a step S101, the flag FLG is set to "0". Upon completion of the process in the step S95 or S101, the reference value RJF is added up in the overwrite frame number OWF in a step S103. Thereafter, the process returns to a routine at a hierarchical upper level.

As can be seen from the above-described explanation, the I/F 30 records the repeatedly-fetched object scene image, as the moving image, on the recording medium 32. The CPU 34 extracts one portion of the object scene images recorded by the I/F 30, in parallel with the recording process of the I/F 30 (S25, S35, S51, and S55 to S57), and a predetermined number, which is an upper limit, of the extracted object scene images are alternatively evacuated (S29 to S33, S43 to S45, S71 to S73, S77, S85 to S87, and S103). Moreover, the CPU 34 allocates the object scene images evacuated at a time point at which the recording process of the I/F 30 is ended, to the moving image recorded on the recording medium 32 (S15 to S17). Furthermore, the CPU 34 starts up the evacuating process at a frequency that is decreased according to an increase in the amount of the moving images recorded by the I/F 34 (S39 to S41, S75, S79, S83, and S91 to S101).

Thus, some portions of the recorded object scene images are extracted in parallel with the recording process, and a predetermined number, which is an upper limit, of the extracted object scene images are alternatively evacuated. Furthermore, the frequency at which the evacuating process is started up is decreased according to an increase in the amount of the recorded moving images. Therefore, intervals of the predetermined number of the evacuated object scene images increase according to an increase in the amount of the recorded moving images, and the predetermined number of the evacuated object scene images are to represent the whole content of the recorded moving image. When such a predetermined number of the object scene images are allocated to the recorded moving image, it becomes possible to comprehend the overview of the recorded moving image in a short period of time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
a recorder which records repeatedly-taken scene images as a moving image;
an extractor which extracts one portion of the scene images recorded by said recorder, in parallel with the recording process of said recorder;
an evacuator which alternatively evacuates a predetermined number, which is an upper limit, of the scene images extracted by said extractor;
an allocator which allocates the scene images evacuated by said evacuator at a time point at which the recording process of said recorder is ended, to the moving image recorded by said recorder; and a controller which starts up said evacuator at a frequency that is decreased according to an increase in an amount of moving images recorded by said recorder.

2. An image processing apparatus according to claim 1, wherein said evacuator includes an allocator which allocates identification numbers to the scene images extracted by said extractor, and a registerer which registers one portion of the identification numbers allocated by said allocator onto a register having columns of which the number is equivalent to the predetermined number.

3. An image processing apparatus according to claim 2, wherein said evacuator further includes a first updater which updates a value of a first variable by an updating width that increases according to an increase in the amount of the moving images recorded by said recorder, and an identification number extractor which extracts the identification number corresponding to the value of the first variable, out of the identification numbers allocated by said allocator, for a registering process of said registerer.

4. An image processing apparatus according to claim 2, wherein said controller includes a determiner which starts up said registerer by determining whether or not an identification number corresponding to a value of a second variable is registered on the register, and a second updater which updates the value of the second variable in a manner that differs depending on a magnitude relationship between the value of the second variable and a threshold value.

5. An image processing apparatus according to claim 4, wherein said determiner executes a determining process after the number of the identification numbers registered on the register reaches the predetermined number.

6. An image processing apparatus according to claim 4, wherein said second updater further includes a variable increaser which increases the second variable when the value of the second variable falls below a threshold value, a reference value increaser which increases the reference value when the value of the second variable is equal to or more than the threshold value, and a setter which sets the reference value to the second variable in association with the increasing process of said reference value increaser.

7. An image processing apparatus according to claim 6, wherein said second updater further includes an increase width controller which increases the increase width of said variable increaser in association with the increasing process of said reference value increaser.

8. An image processing apparatus according to claim 6, wherein the threshold value is equivalent to an integral multiple of the reference value.

9. An image processing apparatus according to claim 1, wherein said allocator includes a combiner which combines in a multi-display manner the scene images evacuated by said evacuator at the time point at which the recording process of said recorder is ended, and an allocation processor which allocates the combined scene image created by said combiner to the moving image recorded by said recorder.

10. An image processing program recorded on a non-transitory recording medium in order to control an image processing apparatus provided with a recorder which records repeatedly-taken scene images as a moving image, the program causing a processor of the image processing apparatus to perform the steps, comprising:
an extracting step of extracting one portion of the scene images recorded by said recorder, in parallel with the recording process of said recorder;
an evacuating step of alternatively evacuating a predetermined number, which is an upper limit, of the scene images extracted by said extracting step;
an allocating step of allocating the scene images evacuated by said evacuating step at a time point at which the recording process of said recorder is ended, to the moving image recorded by said recorder; and
a controlling step of starting up said evacuating step at a frequency that is decreased according to an increase in an amount of moving images recorded by said recorder.

11. An image process method executed by an image processing apparatus provided with a recorder which records repeatedly-taken scene images as a moving image, comprising:
an extracting step of extracting one portion of the scene images recorded by said recorder, in parallel with the recording process of said recorder;
an evacuating step of alternatively evacuating a predetermined number, which is an upper limit, of the scene images extracted by said extracting step;
an allocating step of allocating the scene images evacuated by said evacuating step at a time point at which the recording process of said recorder is ended, to the moving image recorded by said recorder; and
a controlling step of starting up said evacuating step at a frequency that is decreased according to an increase in an amount of moving images recorded by said recorder.

* * * * *